United States Patent
Qin et al.

(10) Patent No.: US 11,586,534 B2
(45) Date of Patent: Feb. 21, 2023

(54) IDENTIFYING FLAKY TESTS

(71) Applicant: MICROSOFT TECHNOLOGY LICENSING, LLC, Redmond, WA (US)

(72) Inventors: Bin Qin, Redmond, WA (US); Mengdie Xia, Redmond, WA (US); Yiliang Xiong, Redmond, WA (US); Fangpeng Guo, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 389 days.

(21) Appl. No.: 16/622,220

(22) PCT Filed: Jun. 13, 2017

(86) PCT No.: PCT/CN2017/088037
§ 371 (c)(1),
(2) Date: Dec. 12, 2019

(87) PCT Pub. No.: WO2018/227367
PCT Pub. Date: Dec. 20, 2018

(65) Prior Publication Data
US 2020/0183821 A1 Jun. 11, 2020

(51) Int. Cl.
*G06F 11/00* (2006.01)
*G06F 11/36* (2006.01)
*G06F 17/18* (2006.01)

(52) U.S. Cl.
CPC ...... *G06F 11/3692* (2013.01); *G06F 11/3688* (2013.01); *G06F 17/18* (2013.01)

(58) Field of Classification Search
CPC ... G06F 11/3688; G06F 11/3692; G06F 17/18
See application file for complete search history.

(56) References Cited

U.S. PATENT DOCUMENTS

| | | | |
|---|---|---|---|
| 7,860,700 B2 | 12/2010 | Behm et al. | |
| 9,032,259 B1 | 5/2015 | Hood | |
| 9,311,220 B1* | 4/2016 | Ha | G06F 11/079 |
| 9,514,037 B1 | 12/2016 | Dow et al. | |
| 9,983,988 B1* | 5/2018 | Quadras | G06F 11/3688 |
| 2003/0046609 A1* | 3/2003 | Farchi | G06F 11/3676 |
| | | | 714/30 |

(Continued)

FOREIGN PATENT DOCUMENTS

| CN | 102012861 A | 4/2011 |
|---|---|---|
| CN | 104503908 A | 4/2015 |

(Continued)

OTHER PUBLICATIONS

"First Office Action and Search Report Issued in Chinese Patent Application No. 201780051221.3", dated Jun. 8, 2021, 12 Pages.

(Continued)

*Primary Examiner* — Joshua P Lottich
(74) *Attorney, Agent, or Firm* — Workman Nydegger (57) ABSTRACT

The present disclosure provides method and apparatus for identifying flaky tests. Historical running data of a test case may be obtained. Statistical analysis may be performed based on the historical running data. It may be determined whether the test case is a flaky test based on the statistical analysis.

17 Claims, 5 Drawing Sheets

(56) References Cited

U.S. PATENT DOCUMENTS

| | | | |
|---|---|---|---|
| 2007/0011541 | A1 | 1/2007 | Kogan et al. |
| 2007/0150886 | A1 | 6/2007 | Shapiro |
| 2011/0145653 | A1* | 6/2011 | Broadfoot ............ G06F 11/3604 |
| | | | 714/E11.217 |
| 2011/0173591 | A1 | 7/2011 | Prasad |
| 2014/0304556 | A1 | 10/2014 | Alexander et al. |
| 2014/0341891 | A1 | 11/2014 | Weeks et al. |
| 2017/0010959 | A1 | 1/2017 | Smith et al. |
| 2017/0068612 | A1* | 3/2017 | Herzig ................ G06F 11/3672 |
| 2017/0091624 | A1 | 3/2017 | Smith et al. |
| 2018/0267884 | A1* | 9/2018 | Dhanda ............... G06F 11/3684 |

FOREIGN PATENT DOCUMENTS

| | | |
|---|---|---|
| CN | 104850584 A | 8/2015 |
| CN | 106155890 A | 11/2016 |
| CN | 106155894 A | 11/2016 |

OTHER PUBLICATIONS

"Notice of Allowance and Search Report Issued in Chinese Patent Application No. 201780051221.3", dated Nov. 24, 2021, 8 Pages.

"Extended European Search Report Issued in European Patent Application No. 17913849.0", dated Oct. 29, 2020, 10 Pages.

"Flaky Test Handler Plugin", Retrieved from: https://wiki.jenkins-ci.org/display/JENKINS/Flaky+Test+Handler+Plugin, Nov. 15, 2014, 5 Pages.

Colantonio, Joe, "139: Test Trend Analysis with Hugh McCamphill", Retrieved from: https://joecolantonio.com/testtalks/139-test-trend-analysis-hugh-mccamphill/, Feb. 5, 2017, 6 Pages.

Farrier, et al., "Making Your Results Visible—A Test Result Dashboard and Comparison Tool", In Proceedings of the Fifth Annual Selenium Conference, Sep. 10, 2015, 9 Pages.

Filimonov, Serguei, "Combating False Positive Failures in CI", Retrieved From: https://content.pivotal.io/blog/combating-false-positive-failures-in-ci, Mar. 24, 2014, 4 Pages.

Filimonov, et al., "rspec_log_formatter", Retrieved from: https://github.com/sergueif/rspec_log_formatter, Retrieved Date: May 18, 2017, 3 Pages.

Q. Luo et al., "An Empirical Analysis of Flaky Tests", ACM Sigsoft International Symposium on Foundations of Software Engineering (2014).

A. Shi et al., "Detecting Assumptions on Deterministic Implementations of Non-deterministic Specifications", 2016 IEEE International Conference on Software Testing, Verification and Validation (2016).

International Search Report and Written Opinion for PCT/CN2017/088037, dated Mar. 26, 2018.

"Notice of Allowance Issued in European Patent Application No. 17913849.0", dated Sep. 9, 2022, 7 Pages.

* cited by examiner

FIG 1

| | Test Task 1 | Test Task 2 | Test Task 3 | Test Task 4 | ... | Test Task m |
|---|---|---|---|---|---|---|
| Test Case 1 | √ | | √ | | ... | √ |
| Test Case 2 | | √ | √ | | ... | |
| Test Case 3 | √ | | √ | √ | ... | √ |
| Test Case 4 | √ | √ | | √ | ... | |
| Test Case 5 | √ | √ | √ | | ... | |
| ... | ... | ... | ... | ... | ... | ... |
| Test Case n | √ | | √ | | ... | √ |

IDENTIFYING FLAKY TESTS

This application is a U.S. National Stage Application of PCT/CN2017/088037, filed Jun. 13, 2017, which application is hereby incorporated by reference. To the extent appropriate, a claim of priority is made to the above disclosed application.

BACKGROUND

During software program developments, program testing may be performed on a developed program, e.g., a program product or a segment of program code, in order to validate the program. A number of test cases may be run for testing the program. Some test cases may have a running result of "pass", while other test cases may have a running result of "failure". Flaky tests may be one of reasons causing the running result of failure. Herein, a "flaky test" refers to a test case that behaves randomly and may lead to both a pass result and a failure result even with the same program.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for identifying flaky tests. Historical running data of a test case may be obtained. Statistical analysis may be performed based on the historical running data. It may be determined whether the test case is a flaky test based on the statistical analysis.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Figure 1:
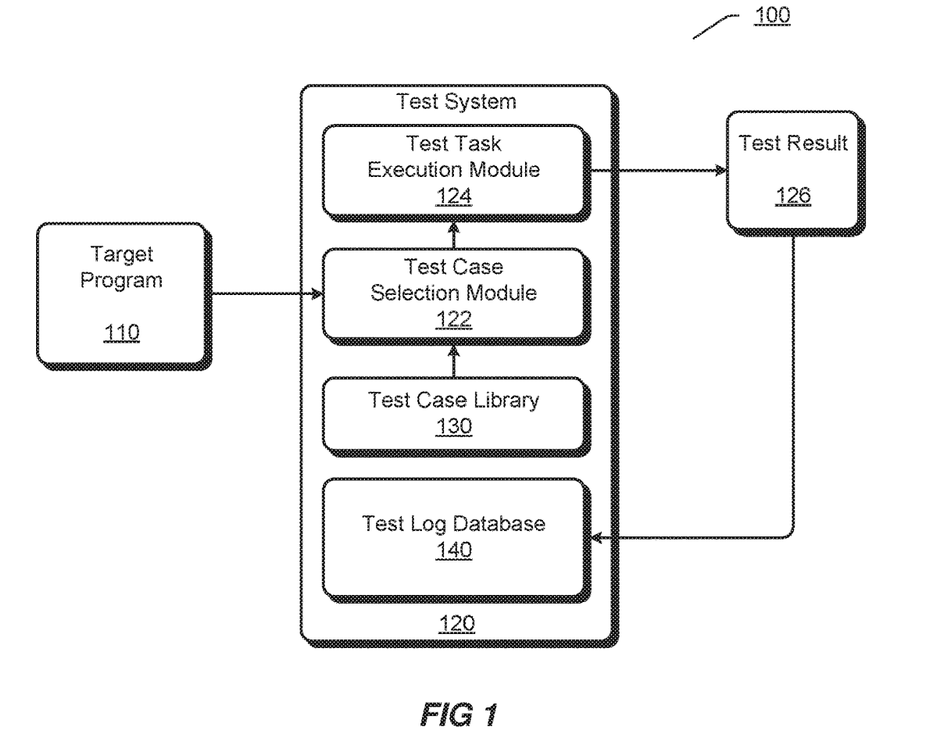
FIG. 1 illustrates an exemplary application scenario of program testing.

FIG. 1 illustrates an exemplary application scenario 100 of program testing.

Target program 110 may be a newly-developed program or an updated program provided by engineers or programmers. Before the target program 110 is incorporated in actual application, e.g., deployed in a product, issued to the public, etc., it may be needed to validate the target program 110 so as to find whether there are any bugs in the target program 110. Program testing may be performed on the target program 110 by a test system 120, so as to validate the target program 110.

The test system 120 shown in FIG. 1 is a logical collection of testing related functions. The test system 120 may be independent from a program developing platform that is used by the engineers or programmers for developing the target program 110, or may be incorporated into the program developing platform.

The target program 110 may be provided to a test case selection module 122 in the test system 120. The test case selection module 122 may select a plurality of test cases from a test case library 130 based on characteristics or functions of the target program 110. Herein, a "test case" may refer to a test program or a test code directed for testing one or more characteristics or functions of a program to be tested. Test cases in the test case library 130 may be established or developed previously. The plurality of test cases selected by the test case selection module 122 for the target program 110 may be collectively referred to as a "test task" for the target program 110.

The test task formed by the plurality of test cases selected by the test case selection module 122 may be executed by a test task execution module 124 in the test system 120. During executing the test task, each of the test cases in the test task will be run. The test task execution module 124 may output a test result 126 of the test task. The test result 126 may include a running result of each test case in the test task.

The test result 126 may be stored in a test log database 140. The test log database 140 may store historical running data of the test cases in the test case library 130.

Figure 2:
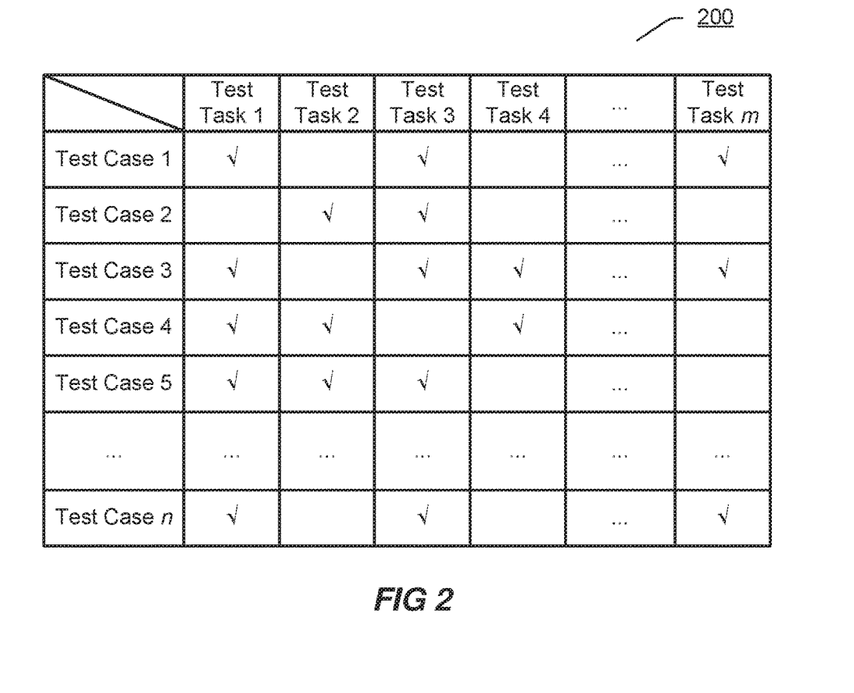
FIG. 2 is an exemplary table showing mapping relationship between test cases and test tasks.

FIG. 2 is an exemplary table 200 showing mapping relationship between test cases and test tasks.

It is assumed that there are n test cases in a test case library. Each of the test cases may be selected and invoked by at least one test task for testing at least one target program. That is, each test case may have one or more test runs executed in respective test task. Herein, one "test run" may refer to running a test case once. Moreover, it is assumed that m test tasks have been established, and each test task may invoke at least one test case and may be executed for testing a corresponding target program. For example, as shown in FIG. 2, Test Case 1 has been invoked by Test Task 1, Test Task 3 and Test Task m, Test Case 2 has been invoked by Task 2 and Test Task 3, and so on.

Moreover, Test Task 1 invokes Test Case 1, Test Case 3, Test Case 4, Test Case 5 and Test Case n, Test Task 2 invokes Test Case 2, Test Case 4 and Test Case 5, and so on.

In some implementations, the mapping relationship shown in the table 200 together with running results of all test runs of each test case may be stored in, e.g., a test log database as historical running data of the test cases.

As mentioned above, a test result for a target program may include running results of a plurality of test cases, and the running results may include "pass" or "failure". A running result of "failure" may be caused by defects in the target program, a flaky test, etc.

A flaky test may lead to a running result of failure for various reasons. For example, if a random number generator is adopted in the flaky test, and during program testing, random numbers generated by the random number generator cannot meet specific requirements, then a running result of the flaky test may be failure. If the flaky test is based on network or file access, and during program testing, no network or file access can be obtained, then a running result of the flaky test may be failure. If the flaky test is associated with a specific date or time, and during program testing, the specific date or time cannot be met, then a running result of the flaky test may be failure.

If it is determined that a running result of failure is caused by the target program, the target program may be further amended or updated so as to overcome the defects and improve quality of the target program. While if a running result of failure is caused by a flaky test, this failure may be useless for determining whether there are any defects in the target program and may lead to distortion in the test result for the target program.

Thus, it would be beneficial to identify flaky tests, and this may help avoiding influence on a final test result of the target program by "failure" running results caused by the flaky tests. The identified flaky tests may be removed from a test case library, or may be amended to be not flaky.

Conventionally, flaky tests may be identified through a re-running approach. For example, if some test cases have running results of "failure", these test cases may be re-run for predetermined times. If re-running results of one of the test cases comprise both "pass" and "failure", this test case is very likely to be a flaky test. While if re-running results of one of the test cases are all "pass" or are all "failure", this test case may be not a flaky test. However, this re-running approach may be highly time-consuming or resource-consuming, especially in the case that there are a large number of test cases needed to be re-run. Another conventional approach for identifying flaky tests may be based on detection of pass-to-failure transitions in running results of a test case. For example, the more the test case has pass-to-failure transitions, the higher possibility the test case is a flaky test. However, this approach may be not accurate enough and may be inefficient.

Embodiments of the present disclosure propose to identify flaky tests based on statistical analysis on historical running data of test cases. A plurality of features may be obtained for the test cases through data mining, and the statistical analysis may be performed based on the features. Through the statistical analysis, if one or more features of a test case meet predefined conditions, this test case may be determined as a flaky test.

In some implementations, the test cases may be pre-processed before performing the statistical analysis. For example, an interference filtering may be performed on the test cases so as to filter those test cases that cannot be determined as a flaky test or not with a high confidence.

In some implementations, a post-processing may be performed on candidate flaky tests identified through the statistical analysis, such that these candidate flaky tests may be further verified as being flaky tests or not.

The embodiments of the present disclosure may identify flaky tests by consuming minimum amount of resources. The identifying of flaky tests according to the embodiments of the present disclosure may be time efficient, e.g., statistical analysis on tens of thousands of test cases may be completed within minutes.

Figure 3:
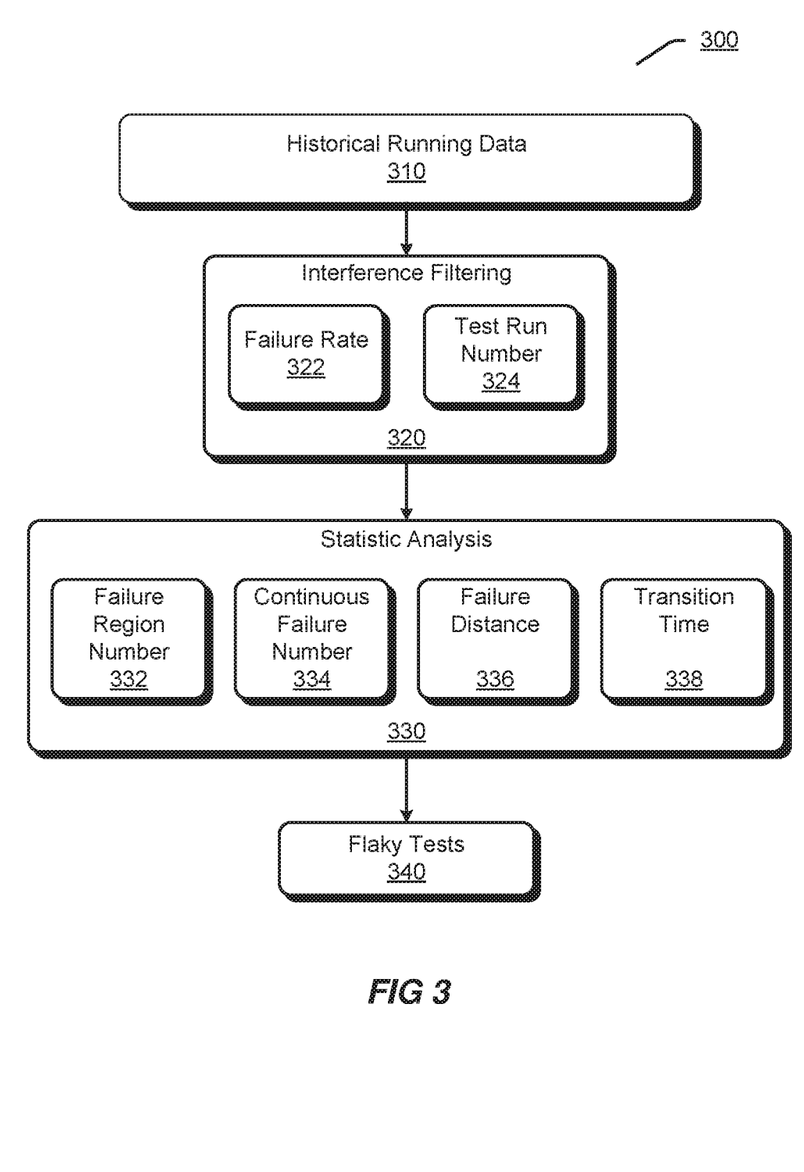
FIG. 3 illustrates an exemplary process for identifying flaky tests according to an embodiment.

FIG. 3 illustrates an exemplary process 300 for identifying flaky tests according to an embodiment.

At 310, historical running data of a group of test cases may be obtained. In an implementation, the historical running data may be retrieved from the test log database 140 shown in FIG. 1. However, the embodiments of the present disclosure are not limited to obtain the historical running data from the test log database, and the historical running data may be obtained through any appropriate approaches. The historical running data may comprise mapping relationship between the test cases and test tasks, running results of test runs of the test cases, time points of the test runs of the test cases, etc. Each of the group of test cases is invoked by at least one test task, and each test task may invoke at least one test case of the group of test cases.

Figure 4:
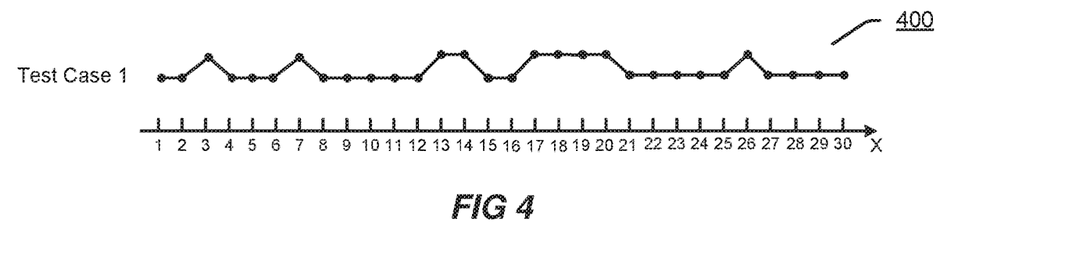
FIG. 4 illustrates an exemplary running curve according to an embodiment.

In some implementations, running curves may be generated, based on the historical running data, for representing running history of test cases. For example, as for a test case, a running curve may be generated based on a plurality of test runs of the test case and corresponding running results. FIG. 4 illustrates an exemplary running curve 400 according to an embodiment. The running curve 400 is generated based on 30 test runs of Test Case 1 and corresponding running results. The X axis in FIG. 4 lists 30 test runs uniformly in a sequential order, denoted by a corresponding number. Each dot on the running curve 400 represents a test run, and amplitude of the running curve 400 at the dot represents a running result of the test run. The running curve 400 may have two types of amplitudes, wherein the higher amplitude indicates a running result of failure, and the lower amplitude indicates a running result of pass. For example, the $3^{rd}$, $7^{th}$, $13^{th}$, $14^{th}$, $17^{th}$ to $20^{th}$, and $26^{th}$ test runs have a running result of failure, while other test runs have a running result of pass. It should be appreciated that the running curve 400 is exemplary, and in actual applications, a test case may have test runs much more than 30 times. Moreover, a running curve may be generated for each test case, and thus, after the historical running data of the group of test cases is obtained at 310, a number of running curves may be generated for the group of test cases.

It should be appreciated that, the embodiments of the present disclosure are not limited to represent running history of test cases by running curves, and running history of test cases may also be represented in any other forms, such as, in running tables. A running table for a test case may list various types of information about test runs of the test case in a sequential order, e.g., a running result of each test run of the test case, etc. Moreover, although the following discussion is based at least in part on running curves, the same technical means or their equivalents may also be applied for any other representing forms of running history of test cases, e.g., running tables, etc.

At 320, an interference filtering may be performed on the group of test cases, for which the historical running data is obtained at 310. Herein, the interference filtering may also be referred to as a pre-processing on the group of test cases. The interference filtering may be performed for filtering, from the group of test cases, those test cases that cannot be determined as a flaky test or not with a high confidence. It should be appreciated that the interference filtering at 320 is optional in the process 300. Various approaches may be adopted for performing the interference filtering.

In an implementation, the interference filtering may be based on failure rates of test tasks. Herein, "failure rate" of a test task may refer to a ratio of the number of test cases having a running result of failure invoked by the test task to the total number of test cases invoked by the test task. A failure rate threshold, e.g., 5%, may be predefined, which may be used for determining whether a failure rate of a test task is too high or not. Usually, if a test task have a failure rate above the failure rate threshold, it is very likely that failure running results of test cases in this test task are caused by execution environment, such as, software problems, hardware problems, etc. That is, it may be difficult to determine, with a high confidence, whether failure running results of test cases in this test task are caused by flaky tests or not. Therefore, it would be beneficial to remove all test cases invoked by this test task from the group of test cases.

In an implementation, the interference filtering may be based on the numbers of test runs of test cases in the group of test cases. If the number of test runs of a test case is below a test run threshold, e.g., 75 times, it may indicate that the test case has not been run for enough times to determine whether it is a flaky test with a high confidence. Thus, this test case may be removed from the group of test cases.

The group of test cases having been performed the interference filtering at 320 may be provided for further statistical analysis.

At 330, statistical analysis may be performed on the group of test cases having been performed the interference filtering. However, as mentioned above, since the interference filtering at 320 is optional and thus may be omitted from the process 300, statistical analysis at 330 may also be performed on the group of test cases directly. Herein, "statistical analysis" may refer to analysis in a statistical approach performed on one or more features of the test cases obtained through data mining. For example, the features of the test cases may be obtained through performing data mining on the running curves of the test cases.

Figure 5:
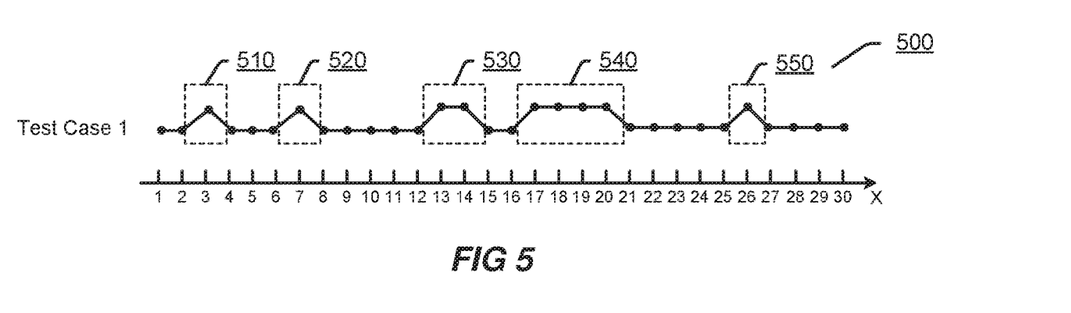
FIG. 5 illustrates an exemplary running curve according to an embodiment.

In an implementation, a feature of the test cases may be "failure region number" 332. Herein, "failure region" may refer to a region formed by one or more continuous failures in a running curve, and "failure region number" may refer to the total number of failure regions in a running curve. FIG. 5 illustrates an exemplary running curve 500 according to an embodiment. Exemplary failure regions are shown by dotted blocks in FIG. 5. For example, dotted block 510 shows a failure region formed by a failure at the $3^{rd}$ test run of Test Case 1, dotted block 520 shows a failure region formed by a failure at the $7^{th}$ test run, dotted block 530 shows a failure region formed by two continuous failures at the $13^{th}$ and $14^{th}$ test runs, dotted block 540 shows a failure region formed by four continuous failures at the $17^{th}$ to $20^{th}$ test runs, and dotted block 550 shows a failure region formed by a failure at the $26^{th}$ test run. It can be seen that the failure region number in the running curve 500 of Test Case 1 is five.

Considering that a flaky test will lead to running results of failure from time to time, which is not a one-time event, the feature of "failure region number" may help to determine a flaky test. For example, if no failure region or few failure regions are included in a running curve for a test case, this test case is very likely not a flaky test. In an implementation, a failure region number threshold, e.g., two, may be predefined, and it may be determined whether the number of failure regions in a running curve for a test case is above the failure region number threshold. If the number of failure regions is above the failure region number threshold, there is a high possibility that the test case is a flaky test. In FIG. 5, since the failure region number of the running curve 500 is five, which is above the failure region number threshold "two", there is a high possibility that Test Case 1 is a flaky test in terms of the feature of "failure region number".

In an implementation, a feature of the test cases may be "continuous failure number" 334. Herein, "continuous failure number" may refer to the total number of failures included in each failure region in a running curve. As shown in FIG. 5, the continuous failure number of the failure regions 510, 520 and 550 is one, the continuous failure number of the failure region 530 is two, and the continuous failure number of the failure region 540 is four.

If a test case keeps failing for a long time in a plurality of continuous test runs, this test case may be not a flaky test, because this test case obtains relatively stable running results of failure in these continuous test runs while a characteristic of a flaky test should be random running results of failure or pass. In an implementation, a continuous failure number threshold, e.g., five, may be predefined, and it may be determined whether the number of continuous failures in each failure region in a running curve for a test case is below the continuous failure number threshold. If the number of continuous failures in each failure region is below the continuous failure number threshold, there is a high possibility that the test case is a flaky test. In FIG. 5, since the continuous failure numbers of the failure regions 510 to 550 in the running curve 500 are all below the continuous failure number threshold "five", there is a high possibility that Test Case 1 is a flaky test in terms of the feature of "continuous failure number".

Figure 6:
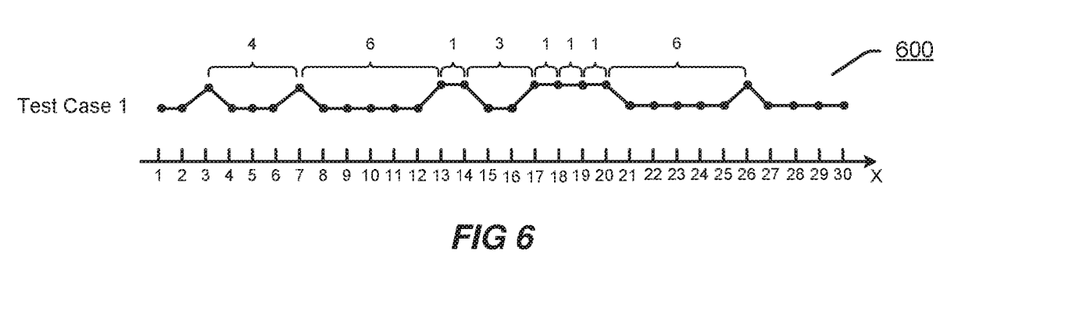
FIG. 6 illustrates an exemplary running curve according to an embodiment.

In an implementation, a feature of the test cases may be "failure distance" 336. Herein, "failure distance" may refer to the number of test runs between each pair of two continuous failures in a running curve. FIG. 6 illustrates an exemplary running curve 600 according to an embodiment. As shown in FIG. 6, the failure at the $3^{rd}$ test run and the failure at the $7^{th}$ test run are a pair of two continuous failures in the running curve 600, and the failure distance between these two failures is four. Similarly, it may be determined that the failure distance between the failure at the $7^{th}$ test run and the failure at the $13^{th}$ test run is six, the failure distance between the failure at the $13^{th}$ test run and the failure at the $14^{th}$ test run is one, and so on.

Since a flaky test will lead to running results of failure from time to time, if a test case keeps pass for a long time in a plurality of continuous test runs, this test case may be not a flaky test. In an implementation, a failure distance threshold, e.g., fifty, may be predefined, and it may be determined whether the number of test runs between each pair of two continuous failures in a running curve is below the failure distance threshold. If the number of test runs between each pair of two continuous failures is below the failure distance threshold, there is a high possibility that the test case is a flaky test. In FIG. 6, since the failure distance between each pair of two continuous failures in the running curve 600 is below the failure distance threshold "fifty", there is a high possibility that Test Case 1 is a flaky test in terms of the feature of "failure distance".

Figure 7:
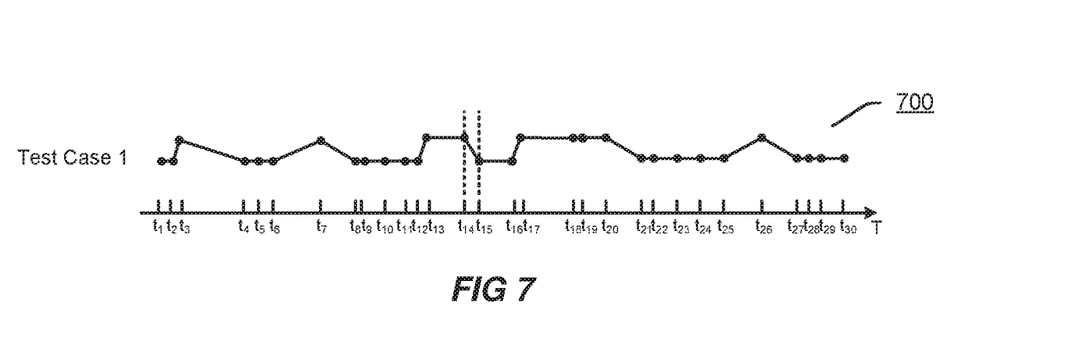
FIG. 7 illustrates an exemplary running curve according to an embodiment.

In an implementation, a feature of the test cases may be "transition time" 338. Herein, "transition time" may refer to the time spent in a transition from failure to pass. FIG. 7 illustrates an exemplary running curve 700 according to an embodiment. The running curve 700 may be deemed as a transformation of the running curve 400 as shown in FIG. 4. The running curve 700 is generated based on 30 test runs of Test Case 1 and corresponding running results. The T axis in FIG. 7 is a time axis, which lists 30 test runs in time sequence, denoted by a corresponding time point respectively. Each dot on the running curve 700 represents a test run, and amplitude of the running curve 700 at the dot represents a running result of the test run. For example, the $1^{st}$ test run at the time point $t_1$ has a running result of pass, the $2^{nd}$ test run at the time point $t_2$ has a running result of pass, the $3^{rd}$ test run at the time point $t_3$ has a running result of failure, the $4^{th}$ test run at the time point $t_4$ has a running result of pass, and so on. There are five transitions included in the running curve 700, such as, a transition from the failure at $t_3$ to the pass at $t_4$, a transition from the failure at $t_7$ to the pass at $t_8$, a transition from the failure at $t_{14}$ to the pass at $t_{15}$, a transition from the failure at $t_{20}$ to the pass at $t_{21}$, and a transition from the failure at $t_{26}$ to the pass at $t_{27}$. As an example, transition time from the failure at $t_{14}$ to the pass at $t_{15}$ may be computed as $t_{15}$-$t_{14}$.

Considering that a programmer cannot fix a defect in a target program too quickly, e.g., within one hour, if running results of a test case changes from failure to pass too quickly, this test case may be a flaky test. In an implementation, a transition time threshold, e.g., one hour, may be predefined, and it may be determined whether a transition time of each transition from failure to pass in a running curve is below the transition time threshold. If a transition time of at least one transition is below the transition time threshold, there is a high possibility that the test case is a flaky test. In FIG. 7, since the transition time from the failure at $t_{14}$ to the pass at $t_{15}$ in the running curve 700 is below the transition time threshold "one hour", there is a high possibility that Test Case 1 is a flaky test in terms of the feature of "transition time".

Although four types of features of "failure region number", "continuous failure number", "failure distance", and "transition time" are discussed above, it should be appreciated that the statistical analysis at 330 is not limited to these features, but can be performed based on any equivalents or any other features of the test cases obtained through data mining.

These features may be used for determining whether a test case is a flaky test independently or in combination. In an implementation, if at least one feature meets a predefined condition, e.g., a predefined corresponding threshold, then this test case may be determined as a flaky test. In an implementation, this test case may be determined as a flaky test if all the features meet predefined conditions respectively. In an implementation, determination results based on the features may be weighted and summed, and this test case may be determined as a flaky test if the sum meets a predefined condition.

Moreover, all the thresholds discussed above, e.g., the failure region number threshold, the continuous failure number threshold, the failure distance threshold, and the transition time threshold, are exemplary, and specific numbers of these thresholds may be defined and adjusted based on actual requirements or expected confidence.

At 340, a determination result of one or more flaky tests that are identified by the statistical analysis may be output.

Figure 8:
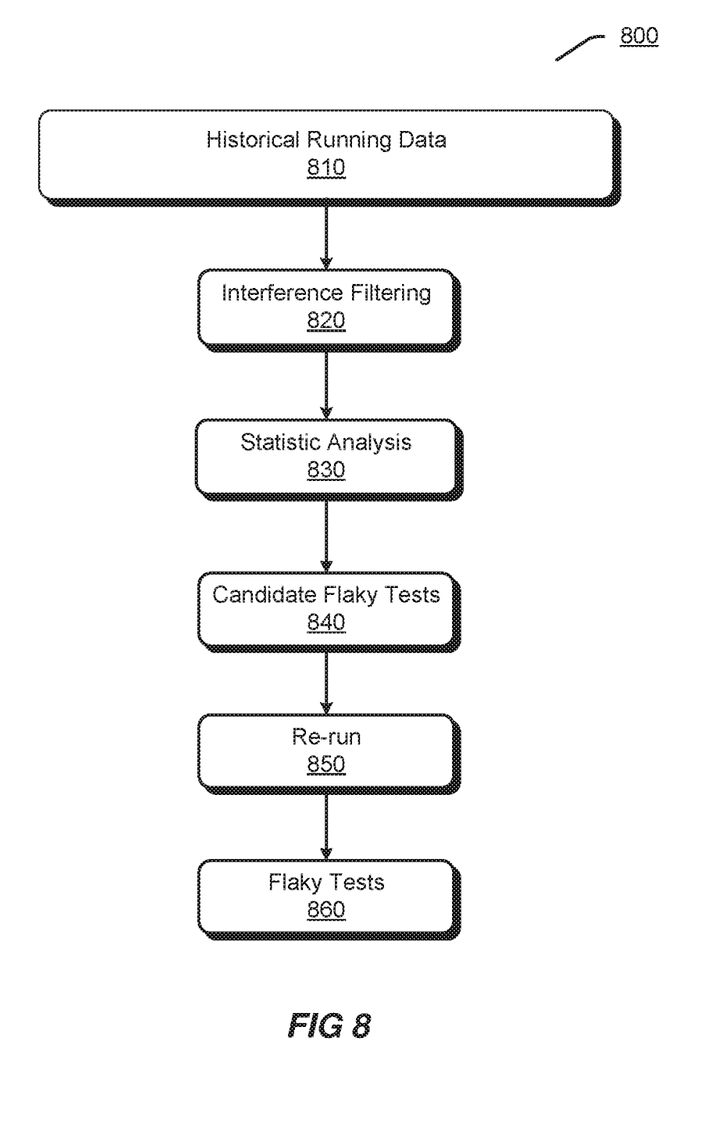
FIG. 8 illustrates an exemplary process for identifying flaky tests according to an embodiment.

FIG. 8 illustrates an exemplary process 800 for identifying flaky tests according to an embodiment. The process 800 shows a further preferred implementation of the process 300 in FIG. 3, and comprises a verification process on a determination result of statistical analysis.

The operations at 810, 820 and 830 in FIG. 8 are the same as the operations at 310, 320 and 330 in FIG. 3, except that the statistical analysis at 830 identifies one or more candidate flaky tests. Herein, "candidate flaky test" may refer to a test case that is very likely to be a flaky test but needs to be further verified.

At 850, a verification process may be performed on the candidate flaky tests. Herein, the verification process may also be referred to as a post-processing on the candidate flaky tests identified through the statistical analysis. In an implementation, the candidate flaky tests may be re-run for predetermined times respectively. Then, flaky tests may be identified from the candidate flaky tests through any conventional approaches for identifying flaky tests based on results of the re-running. It should be appreciated that the verification process may be performed through various approaches, but not limited to the re-running approach.

At 860, a determination result of one or more flaky tests that are identified through verification may be output.

Figure 9:
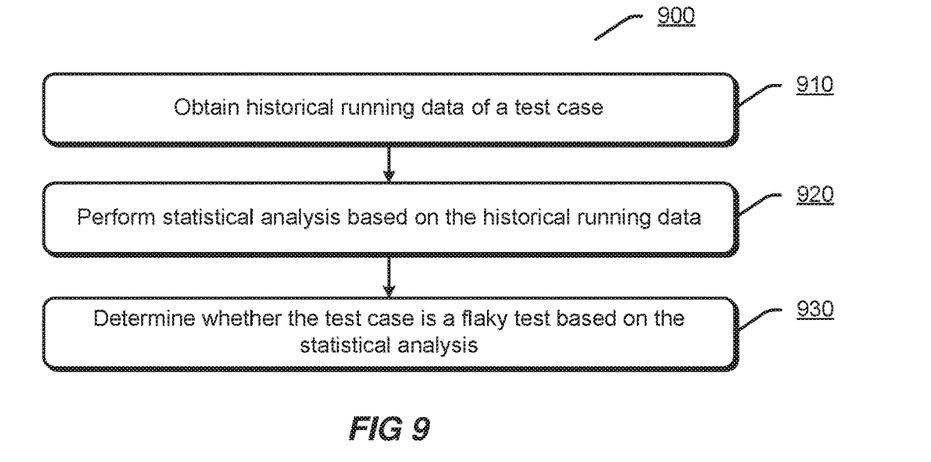
FIG. 9 illustrates a flowchart of an exemplary method for identifying flaky tests according to an embodiment.

FIG. 9 illustrates a flowchart of an exemplary method 900 for identifying flaky tests according to an embodiment.

At 910, historical running data of a test case may be obtained.

At 920, statistical analysis may be performed based on the historical running data.

At 930, it may be determined whether the test case is a flaky test based on the statistical analysis.

In an implementation, the performing the statistical analysis may comprise: identifying a plurality of test runs of the test case and corresponding running results from the historical running data; and performing the statistical analysis based on the plurality of test runs and corresponding running results.

In an implementation, the performing the statistical analysis may comprise: generating a running curve based on the plurality of test runs and corresponding running results; and performing the statistical analysis based on the running curve.

In an implementation, the performing the statistical analysis may comprise at least one of: determining whether the number of failure regions in the running curve is above a failure region number threshold; determining whether the number of continuous failures in each failure region in the running curve is below a continuous failure number threshold; determining whether the number of test runs between each pair of two continuous failures in the running curve is below a failure distance threshold; and determining whether a transition time of each transition from failure to pass in the running curve is below a transition time threshold.

In an implementation, the determining whether the test case is a flaky test may comprise determining that the test case is a flaky test based on at least one of: the number of failure regions in the running curve is above the failure region number threshold; the number of continuous failures in each failure region in the running curve is below the continuous failure number threshold; the number of test runs between each pair of two continuous failures in the running curve is below the failure distance threshold; and a transition time of at least one transition from failure to pass in the running curve is below the transition time threshold.

In an implementation, the method 900 may further comprise: obtaining historical running data of a group of test cases, each of the group of test cases being invoked by at least one test task, each test task invoking at least one test case of the group of test cases; and performing interference filtering on the group of test cases. The test case may be retrieved from the group of test cases having been performed the interference filtering.

In an implementation, the performing the interference filtering may comprise: determining that a failure rate of a test task is above a failure rate threshold; and removing all test cases invoked by the test task from the group of test cases.

In an implementation, the performing the interference filtering may comprise: determining that the numbers of test runs of one or more test cases in the group of test cases are below a test run threshold; and removing the one or more test cases from the group of test cases.

In an implementation, the determining whether the test case is a flaky test may comprise: determining that the test case is a candidate flaky test based on the statistical analysis; re-running the test case for predetermine times; and determining whether the test case is a flaky test based on results of the re-running.

It should be appreciated that the method 900 may further comprise any steps/processes for identifying flaky tests according to the embodiments of the present disclosure as mentioned above.

Figure 10:
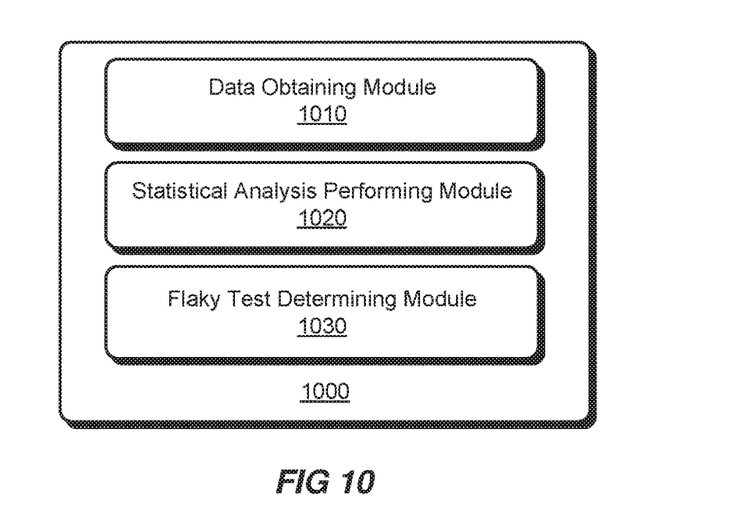
FIG. 10 illustrates an exemplary apparatus for identifying flaky tests according to an embodiment.

FIG. 10 illustrates an exemplary apparatus 1000 for identifying flaky tests according to an embodiment.

The apparatus 1000 may comprise: a data obtaining module 1010, for obtaining historical running data of a test case; a statistical analysis performing module 1020, for performing statistical analysis based on the historical running data; and a flaky test determining module 1030, for determining whether the test case is a flaky test based on the statistical analysis.

In an implementation, the statistical analysis performing module 1020 may be for: identifying a plurality of test runs of the test case and corresponding running results from the historical running data; and performing the statistical analysis based on the plurality of test runs and corresponding running results.

In an implementation, the statistical analysis performing module 1020 may be for: generating a running curve based on the plurality of test runs and corresponding running results; and performing the statistical analysis based on the running curve.

In an implementation, the statistical analysis performing module 1020 may be for at least one of: determining whether the number of failure regions in the running curve is above a failure region number threshold; determining whether the number of continuous failures in each failure region in the running curve is below a continuous failure number threshold; determining whether the number of test runs between each pair of two continuous failures in the running curve is below a failure distance threshold; and determining whether a transition time of each transition from failure to pass in the running curve is below a transition time threshold.

In an implementation, the flaky test determining module 1030 may be for determining that the test case is a flaky test based on at least one of: the number of failure regions in the running curve is above the failure region number threshold; the number of continuous failures in each failure region in the running curve is below the continuous failure number threshold; the number of test runs between each pair of two continuous failures in the running curve is below the failure distance threshold; and a transition time of at least one transition from failure to pass in the running curve is below the transition time threshold.

In an implementation, the data obtaining module 1010 may be for obtaining historical running data of a group of test cases, each of the group of test cases being invoked by at least one test task, each test task invoking at least one test case of the group of test cases. The apparatus 1000 may further comprise an interference filtering module, for performing interference filtering on the group of test cases. The test case may be retrieved from the group of test cases having been performed the interference filtering.

In an implementation, the interference filtering module may be for: determining that a failure rate of a test task is above a failure rate threshold; and removing all test cases invoked by the test task from the group of test cases.

In an implementation, the interference filtering module may be for: determining that the numbers of test runs of one or more test cases in the group of test cases are below a test run threshold; and removing the one or more test cases from the group of test cases.

In an implementation, the flaky test determining module 1030 may be for: determining that the test case is a candidate flaky test based on the statistical analysis; re-running the test case for predetermined times; and determining whether the test case is a flaky test based on results of the re-running.

Moreover, the apparatus 1000 may also comprise any other modules configured for performing any operations of the methods for identifying flaky tests according to the embodiments of the present disclosure as mentioned above.

Figure 11:
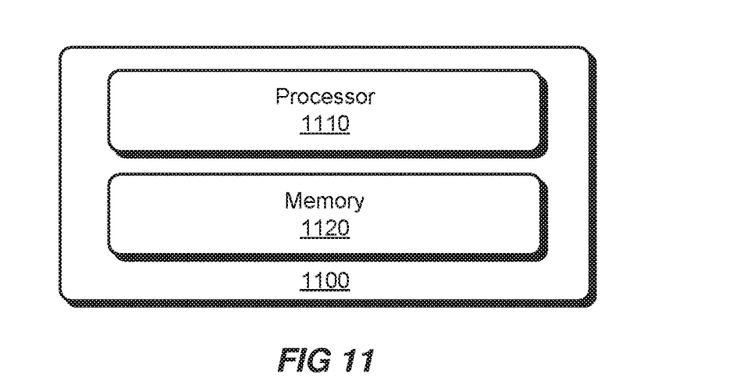
FIG. 11 illustrates an exemplary apparatus for identifying flaky tests according to an embodiment.

FIG. 11 illustrates an exemplary apparatus 1100 for identifying flaky tests according to an embodiment.

The apparatus 1100 may comprise at least one processor 1110. The apparatus 1100 may further comprise a memory 1120 that is connected with the processor 1110. The memory 1120 may store computer-executable instructions that, when executed, cause the processor 1110 to perform any operations of the methods for identifying flaky tests according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for identifying flaky tests according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for improving how test cases are used to validate a software program by identifying, from among the test cases, a set of one or more test cases that are determined to be flaky tests, where a flaky test refers to a defective test case that behaves in an unintentionally random manner, and wherein, by identifying the flaky tests, improved testing of the software program can be achieved by avoiding influence on a final test result of the software program by failure running results caused by the flaky tests, said method comprising:
   in response to determining that a test case has been run at least a threshold number of times, obtaining historical running data of the test case, wherein the historical running data includes test results that were generated as a result of previously running the test case at least the threshold number of times, wherein the test case is one of a plurality of test cases that are included in a test case library and that are used to validate a software program, and wherein the threshold number of times is set to enable the historical running data to be generated so as to subsequently determine whether the test case is a flaky test;
   generating a running curve for the test case using the historical running data, wherein the running curve graphically represents a history of the test case based on that test case being run at least the threshold number of times;
   performing a statistical analysis on the historical running data, including the running curve, wherein the statistical analysis includes data mining the running curve to identify trends of pass results and failure results;
   determining that the test case is the flaky test based on the statistical analysis; and
   in response to determining that the test case is the flaky test, causing the test case to be removed from the test case library or, alternatively triggering a modification to the test case to cure an identified defect of the test case.

2. The method of claim 1, wherein performing the statistical analysis on the historical running data comprises:
   identifying a plurality of test runs of the test case and corresponding running results from the historical running data; and
   performing the statistical analysis based on the plurality of test runs and corresponding running results.

3. The method of claim 2, wherein performing the statistical analysis on the historical running data comprises:
   generating the running curve based on the plurality of test runs and corresponding running results; and
   performing the statistical analysis on the running curve.

4. The method of claim 3, wherein performing the statistical analysis on the historical running data comprises at least one of:
   determining whether a number of failure regions in the running curve is above a failure region number threshold;
   determining whether a number of continuous failures in each failure region in the running curve is below a continuous failure number threshold;
   determining whether a number of test runs between each pair of two continuous failures in the running curve is below a failure distance threshold; and
   determining whether a transition time of each transition from failure to pass in the running curve is below a transition time threshold.

5. The method of claim 4, wherein determining whether the test case is the flaky test comprises determining that the test case is the flaky test based on at least one of:
   the number of failure regions in the running curve is above the failure region number threshold;
   the number of continuous failures in each failure region in the running curve is below the continuous failure number threshold;
   the number of test runs between each pair of two continuous failures in the running curve is below the failure distance threshold; and
   a transition time of at least one transition from failure to pass in the running curve is below the transition time threshold.

6. The method of claim 1, further comprising:
   obtaining historical running data of the plurality of test cases, each test case in the plurality of test cases being invoked by at least one test task, each test task invoking at least one test case in the plurality of test cases; and
   performing interference filtering on the plurality of test cases,
   wherein the test case is retrieved from the plurality of test cases having been performed the interference filtering.

7. The method of claim 6, wherein performing the interference filtering comprises:
   determining that a failure rate of a test task is above a failure rate threshold; and
   removing all test cases invoked by the test task from the plurality of test cases.

8. The method of claim 1, wherein determining whether the test case is the flaky test comprises:

determining that the test case is a candidate flaky test based on the statistical analysis;

re-running the test case for a predetermined number of times; and determining whether the test case is the flaky test based on results of the re-running.

9. An apparatus for improving how test cases are used to validate a software program by identifying, from among the test cases, a set of one or more test cases that are determined to be flaky tests, where a flaky test refers to a defective test case that behaves in an unintentionally random manner, and wherein, by identifying the flaky tests, improved testing of the software program can be achieved by avoiding influence on a final test result of the software program by failure running results caused by the flaky test, said apparatus comprising:

one or more physical processors; and one or more hardware storage devices that store instructions that are executable by the one or more physical processors to cause the apparatus to:

obtain historical running data of a test case, wherein the historical running data is obtained in response to a determination that the test case has been run at least a threshold number of times, wherein the historical running data includes test results that were generated as a result of previously running the test case at least the threshold number of times, wherein the test case is one of a plurality of test cases that are included in a test case library and that are used to validate a software program, and wherein the threshold number of times is set to enable the historical running data to be generated so as to subsequently determine whether the test case is a flaky test;

perform statistical analysis based on the historical running data, wherein a running curve for the test case is generated using the historical running data, wherein the running curve graphically represents a history of the test case based on that test case being run at least the threshold number of times, and wherein the statistical analysis includes data mining the running curve to identify trends of pass results and failure results;

determine whether the test case is the flaky test based on the statistical analysis, wherein, in response to determining that the test case is the flaky test, the test case is removed from the test case library or, alternatively the test case is modified to cure an identified defect of the test case.

10. The apparatus of claim 9, wherein the instructions are further executable to cause the apparatus to:

identify a plurality of test runs of the test case and corresponding running results from the historical running data; and perform the statistical analysis based on the plurality of test runs and corresponding running results.

11. The apparatus of claim 10, wherein the instructions are further executable to cause the apparatus to:

generate the running curve based on the plurality of test runs and corresponding running results; and perform the statistical analysis on the running curve.

12. The apparatus of claim 11, wherein the instructions are further executable to cause the apparatus to:

determine whether a number of failure regions in the running curve is above a failure region number threshold;

determine whether a number of continuous failures in each failure region in the running curve is below a continuous failure number threshold;

determine whether a number of test runs between each pair of two continuous failures in the running curve is below a failure distance threshold; and determine whether a transition time of each transition from failure to pass in the running curve is below a transition time threshold.

13. The apparatus of claim 12, wherein determining that the test case is the flaky test is based on at least one of:

the number of failure regions in the running curve is above the failure region number threshold;

the number of continuous failures in each failure region in the running curve is below the continuous failure number threshold;

the number of test runs between each pair of two continuous failures in the running curve is below the failure distance threshold; and a transition time of at least one transition from failure to pass in the running curve is below the transition time threshold.

14. The apparatus of claim 9, wherein the instructions are further executable to cause the apparatus to:

obtain historical running data of the plurality of test cases, each test case in the plurality of test cases being invoked by at least one test task, each test task invoking at least one test case of the plurality of test cases, perform interference filtering on the plurality of test cases, and the test case is retrieved from the plurality of test cases having been performed the interference filtering.

15. The apparatus of claim 14, wherein the instructions are further executable to cause the apparatus to:

determine that a failure rate of a test task is above a failure rate threshold; and remove all test cases invoked by the test task from the plurality of test cases.

16. The apparatus of claim 9, wherein the instructions are further executable to cause the apparatus to:

determine that the test case is a candidate flaky test based on the statistical analysis;

re-run the test case for a predetermined number of times; and determine whether the test case is the flaky test based on results of the re-running.

17. An apparatus for improving how test cases are used to validate a software program by identifying, from among the test cases, a set of one or more test cases that are determined to be flaky tests, where a flaky test refers to a defective test case that behaves in an unintentionally random manner, and wherein, by identifying the flaky tests, improved testing of the software program can be achieved by avoiding influence on a final test result of the software program by failure running results caused by the flaky tests, said apparatus comprising:

at least one processor; and a memory that stores computer-executable instructions that are executable by the at least one processor to cause the apparatus to:

in response to determining that a test case has been run at least a threshold number of times, obtain historical running data of the test case, wherein the historical running data includes test results that were generated as a result of previously running the test case at least the threshold number of times, wherein the test case is one of a plurality of test cases that are included in a test case library and that are used to validate a software program, and wherein the threshold number of times is set to enable the historical running data to be generated so as to subsequently determine whether the test case is a flaky test;

generate a running curve for the test case using the historical running data, wherein the running curve graphically represents a history of the test case based on that test case being run at least the threshold number of times perform a statistical analysis on the historical running data, including the running curve, wherein the statistical analysis includes data mining the running curve to identify trends of pass results and failure results;

determine that the test case is the flaky test based on the statistical analysis; and in response to determining that the test case is the flaky test, cause the test case to be removed from the test case library or, alternatively trigger a modification to the test case to cure an identified defect of the test case.

\* \* \* \* \*